Nov. 8, 1955  G. M. HICKEY  2,722,932
DISPOSABLE BLOOD DONOR SET
Filed May 12, 1954
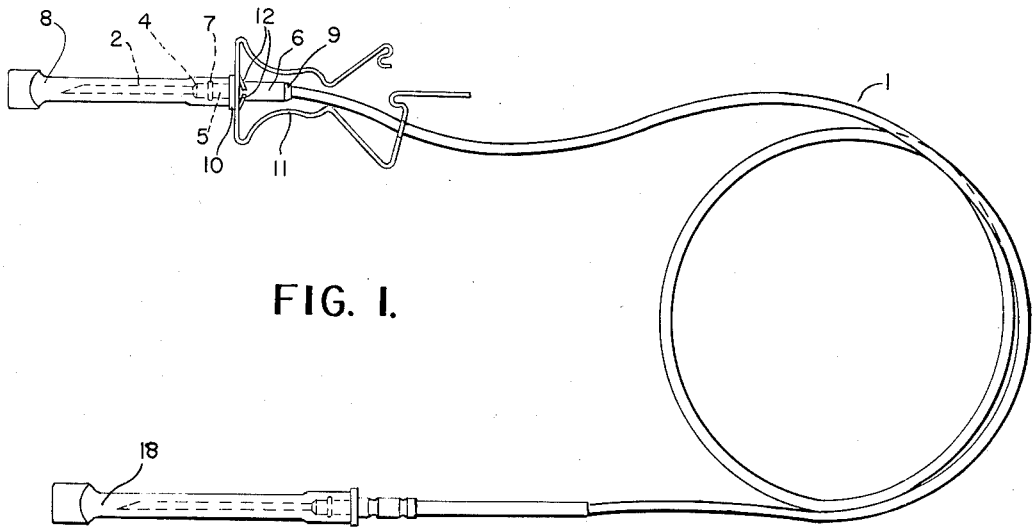
FIG. 1.
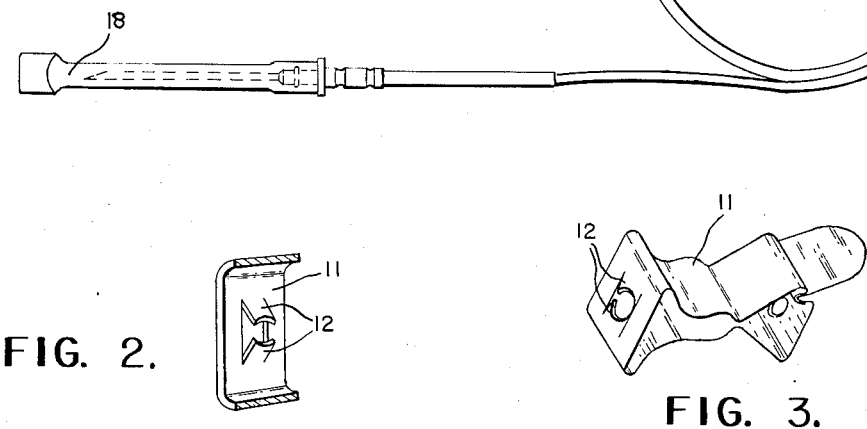
FIG. 2.
FIG. 3.
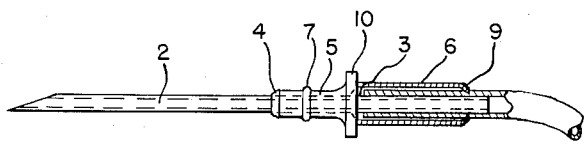
FIG. 4.
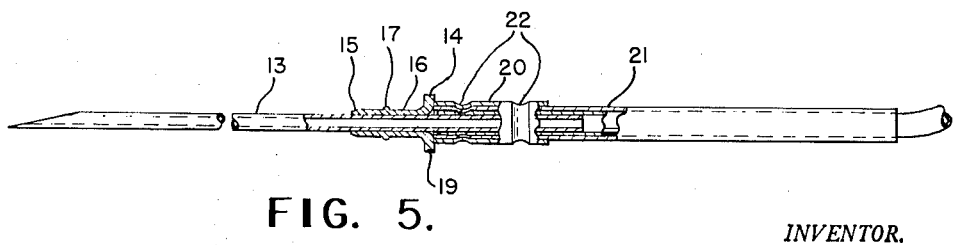
FIG. 5.
INVENTOR.
George M. Hickey
BY
Pierce, Scheffler & Parker
atty's

United States Patent Office 2,722,932
Patented Nov. 8, 1955

2,722,932
DISPOSABLE BLOOD DONOR SET

George M. Hickey, Paoli, Pa., assignor to J. Bishop & Co. Platinum Works, Malvern, Pa., a corporation of Pennsylvania Application May 12, 1954, Serial No. 429,282

2 Claims. (Cl. 128—214)

This invention relates to apparatus for transferring blood from a donor to a receptacle or flask.

An object of my invention is to provide a blood donor set which is reliable and efficient in operation but simple and inexpensive and therefore adapted to be discarded after a single use.

Blood donor apparatus typically consists of two needles, one to be inserted into the donor and one to be inserted into the flask in which the blood is to be collected, said needles being connected by a flexible tube of synthetic plastic such as vinyl resin and means such as a clamp for controlling the flow of blood through the tube.

Extensive experience in recent years in the collection of blood from millions of donors have revealed defects in the equipment heretofore employed. Common defects are that the equipment is too complex and costly, that its use requires a considerable amount of skill, that it causes fatigue in the operator and that it causes loss of time.

The equipment of the present invention either wholly or partly obviates all of the well recognized defects in prior equipment.

The equipment of the present invention consists essentially of the two needles referred to above, preferably formed of stainless steel and connected by a suitable length and size of non-toxic and sterilizable synthetic resin or plastic tubing such as polymerized vinyl chloride through rigid hubs of suitable material such as brass, a pinch spring clamp of suitable material such as stainless steel and protective caps for the needles preferably formed also of synthetic resin or plastic such as the vinyl chloride polymer.

The invention will be described in greater detail and additional features of construction disclosed in connection with the accompanying drawings in which Fig. 1 is a front elevational view of the complete blood donor set assembly, Fig. 2 is a fragmentary perspective view of the base end of the clamp, Fig. 3 is a perspective view of the whole clamp, Fig. 4 is an elevational view of the flask needle and its hub and Fig. 5 is an elevational view, partly in section of the donor needle and its hub and sleeve assembly.

Referring to the drawings, 1 is the flexible tube which as stated may be formed of any suitable flexible material preferably having a smooth, insoluble and non-toxic surface which will not coagulate the blood or contaminate it and which is capable of heat sterilization. In the synthetic resin art a number of suitable materials are available such as the vinyl chloride polymers. Experience has taught that the flexible tube should be about 30 inches in total length, about .057 inch internal diameter and capable of withstanding about 28 inches of mercury vacuum without collapsing. The length of tube between the clamp at one end and the sleeve associated with a needle at the other end i. e. the free flexible portion of the tube should be about 24 inches after sterilization, 2 is the flask needle and 3 is the hub by means of which the needle 2 is secured to or in communication with the tube 1. For the purpose of the description of the present invention the needle 2 may be said to be a conventional needle of about 17 gauge and about 2 inches long. The needle cannula extends through the hub 3 and is secured therein by staking the end 4 of the hub. The hub 3 has two integral cylindrical portions 5 and 6. The portion 5 has a bore of a size permitting the insertion of the needle cannula and preferably but not necessarily is provided with an external ridge 7 which cooperates with the needle protecting cap 8. The portion 6 has a bore adapted to receive an end of the tube 1 between it and the needle cannula. The tube is secured to the hub by staking the end 9 of the hub. The portions 5 and 6 of the hub 3 are separated by the flange 10 which serves as an abutment or stop for the pinch clamp 11 which is secured to the hub by the tines 12. The donor needle 13, is, for the purpose of the present invention, a conventional needle of about 17 gauge and about 2.5 inch length. It extends through the hub 14 and is secured thereto by staking at 15. The hub 14 is similar to the hub 3, i. e. its end 16 adjacent the point of the needle has a bore which fits the needle cannula and also preferably but not necessarily is provided with an external ridge 17 which cooperates with the cap 18 for releasably securing the latter to the hub. The hub 14 is provided with the flange 19 similar to the flange 10 on the hub 3 but the flange 19 serves as a stop to prevent the fingers of the operator from slipping forward when the needle is being inserted into the donor. The other end 20 of the hub 14 has a bore adapted to receive the sleeve 21 preferably formed of metal such as stainless steel. As appears in Fig. 5 the sleeve 21 and the cannula of the needle 13 are spaced apart to receive the end of the tube 1. The hub 14, the tube 1 and the sleeve 21 are secured together by staking at 22.

Thus it will be seen that the clamp 11 secured to the hub 3 and the sleeve 21 secured to the hub 14 provide rigid handles by means of which the two needles are manipulated i. e. inserted into and withdrawn from the flask and the donor respectively.

The caps 8 and 18 may be satisfactorily held on the needles by friction without the provision of the external ridges 7 and 17.

I claim:

1. A blood donor set comprising a flexible tube, a donor needle cannula secured to and communicating with one end of said tube, a hub having a bore in one end portion thereof of substantially the same size as said cannula and secured thereto by staking, said end portion of said hub having an external ridge adapted to engage and removably retain a needle cap, the other end portion of said hub having a bore of larger size than said tube, a rigid sleeve secured to said hub within said bore by staking and extending rearwardly from said hub over a portion of said tube, a flask needle cannula secured to and communicating with the other end of said tube, a hub secured to said flask needle cannula, a pinch clamp rigidly secured to said flask needle hub in operative relation to said tube and said donor needle hub having an external flange between said two end portions adapted to serve as a finger stop.

2. A blood donor set as defined in claim 1 in which the donor needle cannula extends all the way through the two end portions of the donor needle hub and the flexible tube is secured between the cannula and the sleeve and the latter is secured to the hub by staking the latter.

References Cited in the file of this patent

UNITED STATES PATENTS

| | | |
|---|---|---|
| 2,452,643 | Fields | Nov. 2, 1948 |
| 2,689,564 | Adams | Sept. 21, 1954 |

FOREIGN PATENTS

| | | |
|---|---|---|
| 478,459 | Canada | Nov. 13, 1951 |